US011194916B1

(12) United States Patent
Roth et al.

(10) Patent No.: US 11,194,916 B1
(45) Date of Patent: Dec. 7, 2021

(54) INTELLIGENT PERSONAL ASSISTANT DEACTIVATION

(71) Applicant: UIPCO, LLC, San Antonio, TX (US)

(72) Inventors: Matthew Louis Dent Roth, Boerne, TX (US); Sheryl Lane Niemann, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 153 days.

(21) Appl. No.: 16/574,629

(22) Filed: Sep. 18, 2019

Related U.S. Application Data

(60) Provisional application No. 62/785,001, filed on Dec. 26, 2018.

(51) Int. Cl.
*H04L 29/06* (2006.01)
*G06F 21/60* (2013.01)
*G06F 21/55* (2013.01)

(52) U.S. Cl.
CPC ............ *G06F 21/60* (2013.01); *G06F 21/554* (2013.01); *H04L 63/0272* (2013.01); *H04L 63/1416* (2013.01); *H04L 63/1458* (2013.01); *H04L 63/205* (2013.01)

(58) Field of Classification Search
CPC ........ G06F 21/60; G06F 21/554; G06F 21/50; G06F 21/577; H04L 63/0272; H04L 63/1416; H04L 63/205; H04L 63/10; H04L 63/107; H04L 63/108; H04L 63/20
See application file for complete search history.

(56) References Cited

U.S. PATENT DOCUMENTS

| | | | | |
|---|---|---|---|---|
| 2010/0333177 | A1* | 12/2010 | Donley | G06F 21/6218 726/4 |
| 2016/0155443 | A1* | 6/2016 | Khan | G06F 1/3203 704/275 |
| 2017/0245076 | A1* | 8/2017 | Kusano | H04L 65/1096 |
| 2019/0036923 | A1* | 1/2019 | Xuan | H04L 67/141 |

* cited by examiner

*Primary Examiner* — Edward Zee
(74) *Attorney, Agent, or Firm* — Plumsea Law Group, LLC (57) ABSTRACT

A system and method for mitigating risks when a company employee logs in to the company server from a remote location such as her home office, a hotel room or a public location such as a coffee shop. The system mitigates any risks by ensuring that voice-activated functions such as IPAs on intelligent listening devices are disabled while the employee is working from the remote location.

20 Claims, 11 Drawing Sheets

INTELLIGENT PERSONAL ASSISTANT DEACTIVATION

CROSS-REFERENCE TO RELATED APPLICATIONS

This application claims the benefit of Provisional Patent Application No. 62/785,001, filed Dec. 26, 2018, and titled "Intelligent Personal Assistant Deactivation," which is incorporated by reference herein in its entirety.

TECHNICAL FIELD

This disclosure relates generally to systems for ensuring the security and privacy of confidential information exchanged during communications between employees of a corporation or other entity and customers or clients of that entity.

BACKGROUND

Many corporations, universities, government offices, institutions and other entities require their employees to engage in telephone communications with third parties, such as customers, clients, consultants or contractors, for example. During the course of these communications, confidential information and/or proprietary information may be exchanged between the employee and the third party. Such confidential information may be, for example, the third party's credit card number, bank account number or other financial information. The proprietary information could be, for example, the entity's proprietary information such as pricing, contractual terms and other trade secrets.

Many entities now have substantial numbers of their employees working regularly or occasionally from their own home on their computers, communicating with their employer over the Internet via a home network. Employees may also be working in less secure public environments, such as a hotel room, a coffee shop or a library. In many cases, the home environment is not as secure as the office environment, because the home environment may include one or more intelligent listening devices or ILDs. In many cases, the ILDs house intelligent personal assistants or IPAs. Thus the terms "ILD" and "IPA" may be used interchangeably in the descriptions of the embodiments disclosed herein. The home environment typically also includes smart phones, which may also host an IPA. Note that IPAs may also be referred to by other names, such a "Virtual Assistant," for example. For the purposes of this disclosure, the terms "intelligent personal assistant" (or "IPA") and intelligent listening device (or "ILD") shall both refer to any device that actively listens and responds to voice-activated commands, as well as to any application on any device that actively listens and responds to voice-activated commands.

When the employee is working from home and the home includes one or more ILDs that host an IPA, it is possible that the ILD or IPA may accidentally happen to capture some confidential and/or proprietary information. The ILD or IPA may in turn incidentally pass on scraps or all of that information to other devices in the home over the home's local area network. Examples of other devices that may be in communication with the device that hosts an IPA include, for example, mobile devices such as smart phones, tablets or laptops. They may also include stationary devices such as a refrigerator, a TV set, a microwave oven, a doorbell monitor and many other appliances or devices. The network that connects these everyday devices to each other may be referred to as the "Internet of Things," or the "IoT." Because all or some of these devices have the capability of capturing and transmitting information over the IoT, it is possible that the IPA, ILD or some application or device on the network may at that time or at a later time disseminate some of that confidential or proprietary information either directly or through one of the other devices connected to the IoT to persons who should not receive that information.

In addition to the home environment, the employee may be in a somewhat less private environment, such as, for example, a hotel room or other non-public location that nevertheless is less secure than working in a private setting such as the employee's home. In other situations, the employee may be working at a public location such as a coffee shop or a library. These situations may also pose some risk that confidential or proprietary information may inadvertently be disclosed to third parties.

For these reasons, there is a need for systems and methods that secure the confidentiality of that confidential and/or proprietary information.

SUMMARY

In one aspect, embodiments include a system for deactivating an intelligent personal assistant on a home private network that includes a router, a personal computer and at least one voice-activated device. The personal computer can communicate with a company computer through a server. A deactivation app in communication with the router is housed in at least one of the server, the company computer and the personal computer. The voice-activated device has an Intelligent Personal Assistant or IPA. The IPA responds to voice commands and can store auditory information in its memory banks. The deactivation app can deactivate voice recognition in the IPA by issuing commands to the voice-activated device through the personal computer, thus mitigating the risk of inadvertently disseminating confidential or proprietary information.

In another aspect, embodiments include a system for mitigating the risk of inadvertently disseminating confidential or proprietary information when using a telephone in the presence of a voice-activated device. The system includes a local area network in a location that includes a router and a number of devices in communication with the local area network. The devices include a personal computer as well as the voice-activated device, which houses an IPA. The system also includes a number of additional devices that can receive and store auditory information and are also in communication with the local area network. The system further includes an IPA deactivation app can cause the personal computer to issue a voicekill command to the voice-activated device to turn off its voice activation function for either a prescribed time period or until the voice activation function is turned back on manually.

In another aspect, embodiments include a method for preventing the incidental dissemination of confidential or proprietary information when using a telephone in a location with a local area network. The method includes identifying all devices in communication with the local area network, identifying voice-activated devices among all the devices in communication with the local area network, and then disabling the voice-activated functions on the voice-activated device.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for protecting the inadvertent disclosure of confidential or proprietary information through intelligent listening devices. The term "Internet of Things" or "IoT" refers to the interconnection via a local area network, such as a home network, of computing devices including not just desktop or laptop computers, but other everyday devices such as microwave ovens, refrigerators and smartphones which may interact over a local network and possibly over the Internet with local or remote computers, smartphones or other devices. The term "Intelligent Personal Assistant" shall refer to applications that are voice activated and listen to and respond to voice commands. Also, although in many instances this disclosure describes embodiments in terms of smart phones, it should be understood that the reference is to any smartphone or other communications device that houses a voice-activated function such as the smart phone's IPA function.

Figure 1:
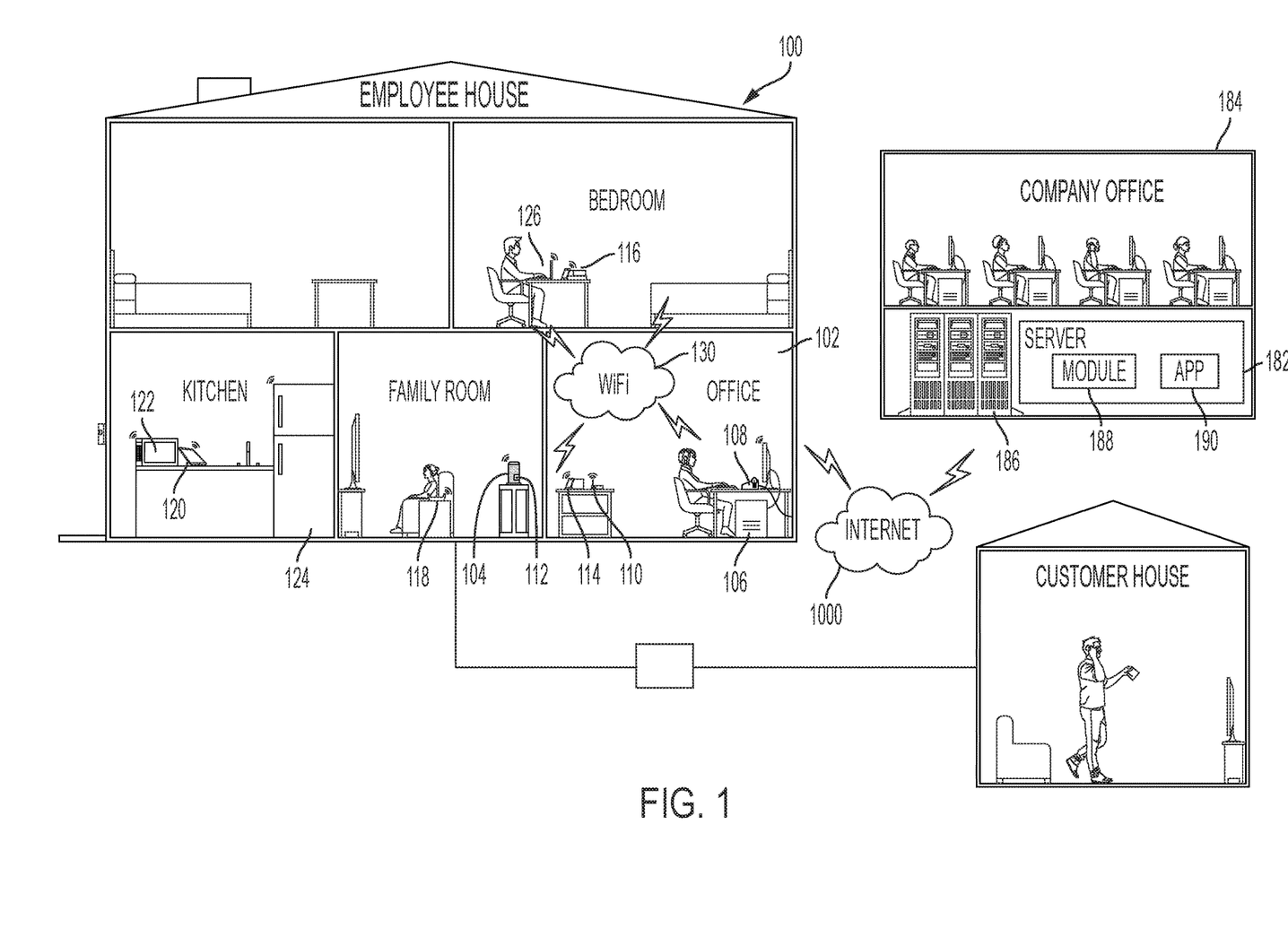
FIG. 1 is an illustration of an employee working in a home environment.

FIG. 1 is a schematic diagram showing the environment of an employee of a company who is working remotely from an office 102 on the first floor of her home 100. The employee is using a desktop computer 106 and talking to a customer over a landline telephone 108. The desktop computer 106 is in communication with a server 182 at her company's office over the Internet via a router 110. During this conversation, she may be receiving confidential information from the customer, including for example the customer's financial information such as his credit score, his credit card number and/or his bank account number. She may also be providing the customer with her company's proprietary information, such as prices, terms and policies. A student may be doing homework on a laptop 126 in a bedroom on the second floor. On the first floor, a young child is watching TV in a family room on the first floor. The door between the office and the family room is partly open. There's an ILD 104 in the family room, near the door to the office. The ILD includes an IPA 112, which may be addressed by saying reciting a code word or phrase. There is a smart phone 114 on a table behind employee's desk, a smart phone 116 on the student's desk and a WiFi-capable handheld gaming device 118 next to the child. There's a tablet 120 on a counter in the kitchen. There is also a refrigerator 124 and a microwave oven 122 in the kitchen. Collectively, the home network and all of the devices that communicate directly (i.e., through router 110, but not through the Internet 1000) with the home network form a local Internet of Things or a local IoT.

The router 110 for home network 130 is shown on the table in the employee's office. Home network 130 is most often a WiFi network (and will be referred-to below as such) but in some cases may be a wired network. Normally, the desktop 106, the laptop 126, the smart phone 114, the smart phone 116, the gaming device 118 and the tablet 120, as well as a microwave 122 and a refrigerator 124 are on the home WiFi network 130. These devices may also communicate over the home WiFi network 130 and router 110 and then over the Internet 1000 to remote computers, servers or other devices. For that reason, the recipients of such accidentally transmitted information may be both unknown and unknowable.

The employee's desktop computer 106 communicates via router 110 over the Internet to her company's office 184, via a server 182. The server houses an office communications module 188 and a deactivation app 190. In some cases, the deactivation app may instead be housed on the employee's home computer, her router or on a separate device connected to her home network. The company's customer files, proprietary information, employee data, company policies and procedures and other information are stored in a large database 186 shown next to server 182 in FIG. 1. During the course of her workday, the employee may access information stored in database 186 as she goes about her daily work routines.

In the example shown in FIG. 1, the employee is talking to a customer over the speaker phone on her landline telephone 108. She may need to put her customer on the speakerphone so that, for example, her hands are free to take notes or to access the company's data in database 186. During the discussion, the employee and the customer may be exchanging confidential and/or proprietary information over their phones. For example, the customer may be providing his credit card number and/or bank account information to the employee, and the employee may be quoting prices and terms to the customer, based upon her review of the proprietary price lists, policies and other proprietary information on the company server 182.

An intelligent listening device 104 may be located near an open door to the employee's home office, within listening distance of the employee and her speakerphone. For that reason, if the intelligent listening device is in an intelligent listening mode, it may record some of what the employee and/or the customer are saying during the telephone call. At this point, confidential and/or proprietary data has already left the company's secure locations (the employee's computer and the company database) because it may now be stored on the ILD or even communicated to any device that is in communication with the ILD, for example over the Internet. Since the ILD is in communication with home network 130, some of that information may also potentially be accidentally transmitted to any of the other devices on the home network 130. These devices, of course, include router 110, which may then accidentally transmit the information over the Internet 1000, to any of thousands of destinations. Also, the smart phone 114, the smart phone 116, the table 120 and the handheld gaming device 118 are portable devices that are typically used outside the home as well as in the home. Should some confidential or proprietary information be accidentally transmitted to one of those devices, that information could then be again accidentally transmitted at a public location such as a coffee shop, a restaurant or a school over an unsecured publicly accessible network to remote and largely unknowable third parties' devices.

In addition to the ILDs that house IPAs, other devices could also be actively listening to the discussion between the employee and her customer. For example, smart phones may have an intelligent listening function. In smart phones, that intelligent listening function is typically addressed by using a specific phrase or word to address the ILD or by pressing a side button. The side button may be accidentally pushed (or the smart phone may pick up a phrase or word from a person or a TV broadcast that is close enough to specific word so that it responds as if the employee had actually said the command. The smart phone may then be placed into an intelligent listening mode without the employee (or someone else) realizing that it is in the intelligent listening mode, and may therefore accidentally record confidential and/or proprietary information. Thus smartphones could pose a risk even when they are not connected to a home network (for example, a visitor's smart phone) because they can take information out of the home without even going through the router.

Although FIG. 1 is described in terms of smart phones and a tablet, it should be understood that the descriptions apply to any smartphone or other mobile communications device that houses a voice-activated function such as the smart phone's IPA function.

Figure 2:
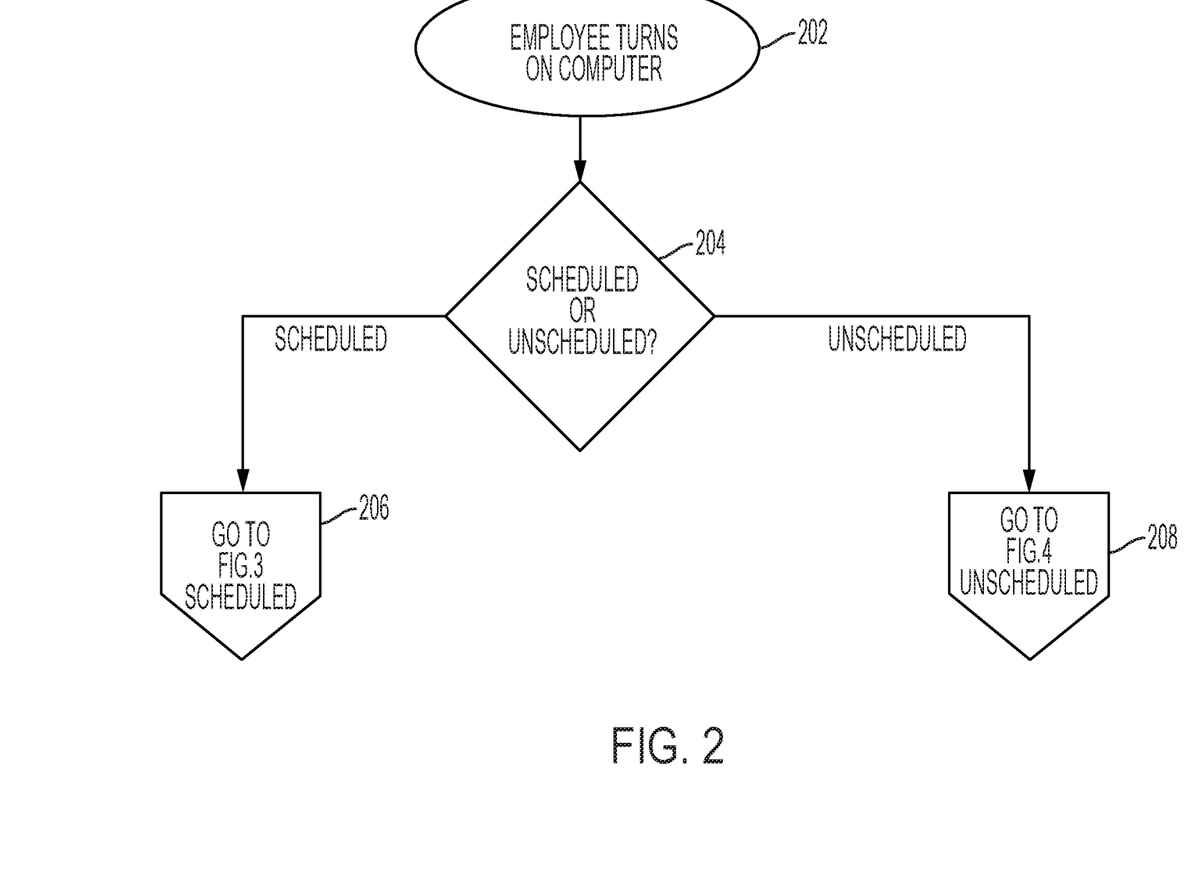
FIG. 2 is an exemplary flowchart showing the start of the login process when an employee logs into a remote company server.
Figure 3:
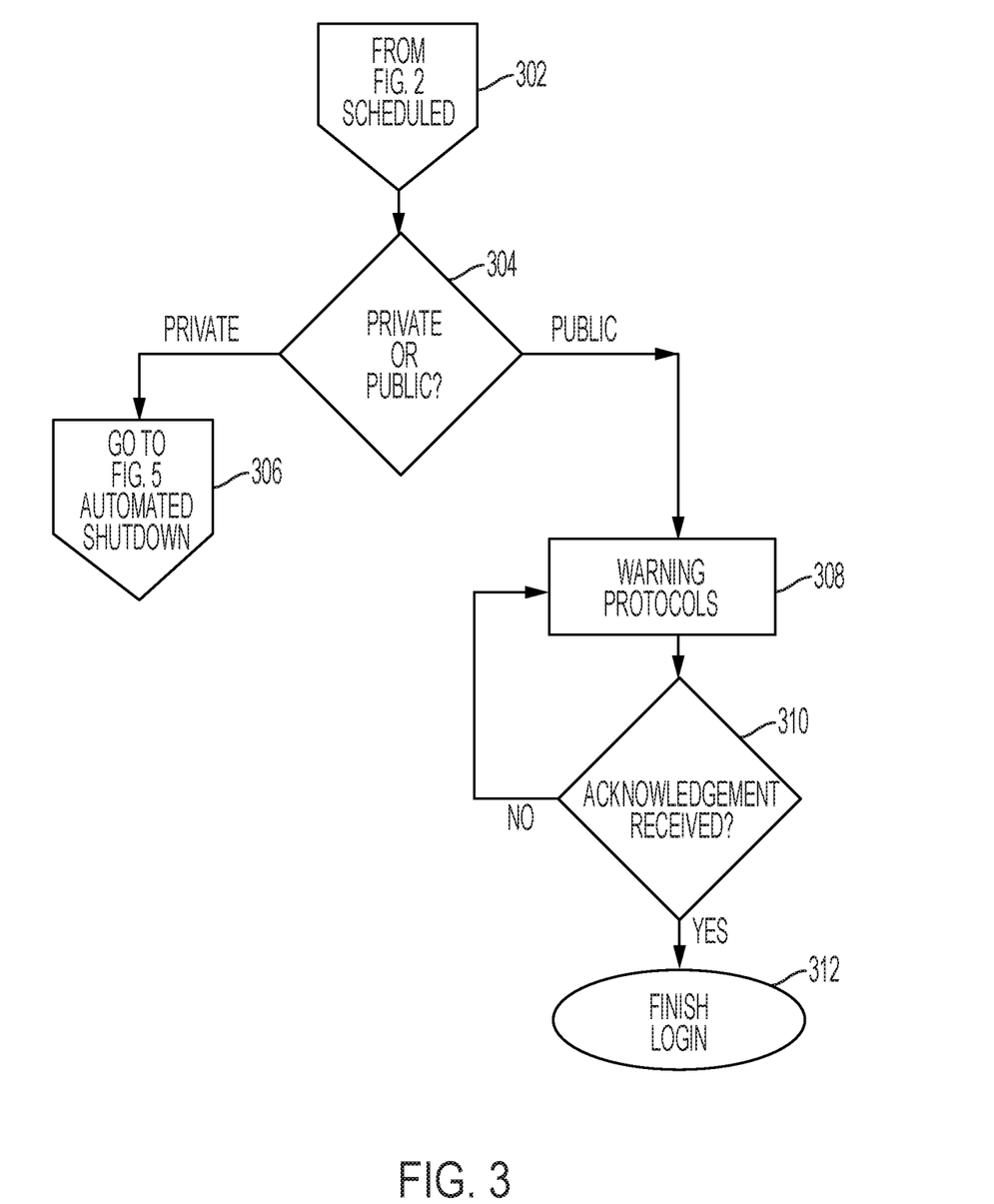
FIG. 3 is an exemplary flowchart showing the continuation of the process started in FIG. 2 for scheduled work.
Figure 4:
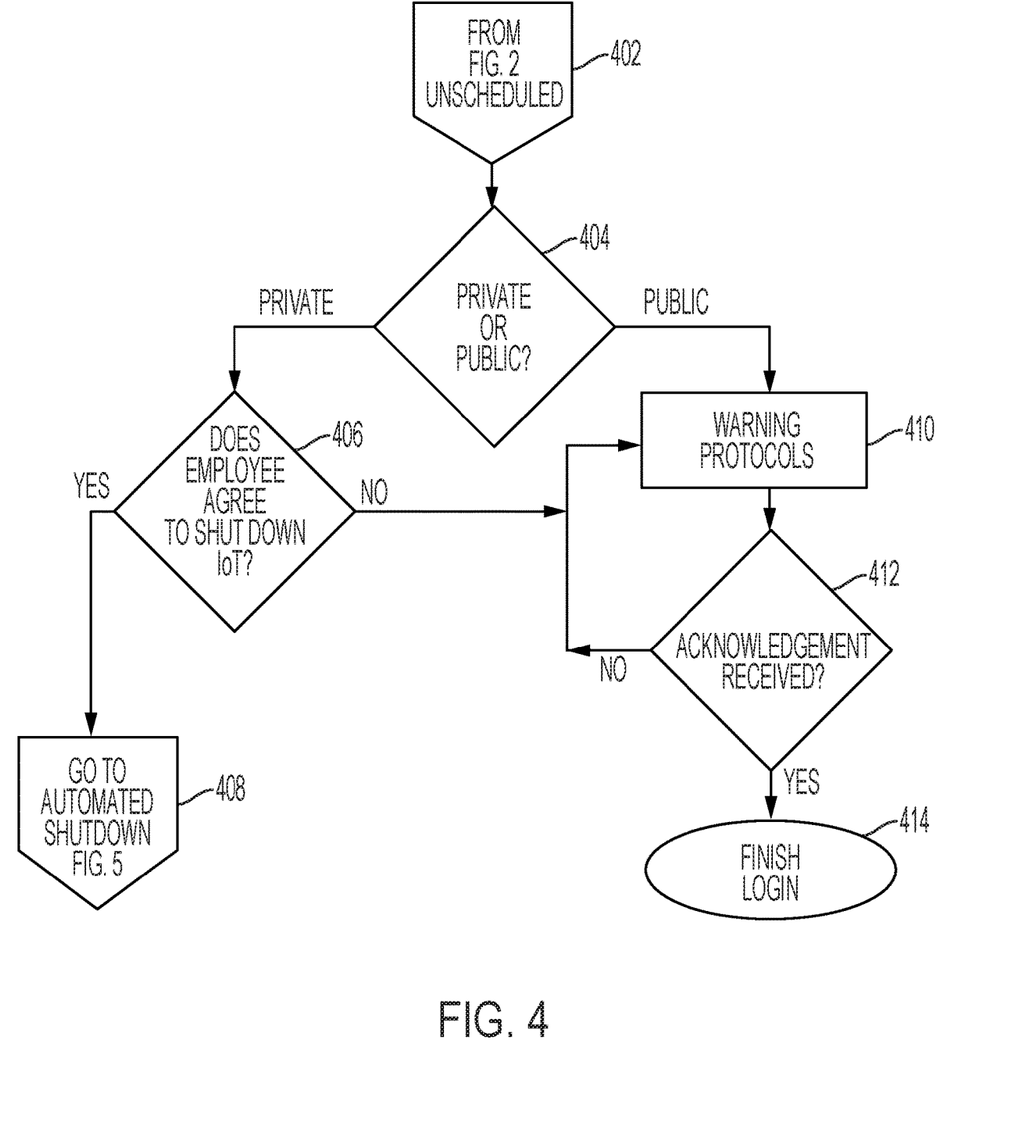
FIG. 4 is an exemplary flowchart showing the continuation of the process shown in FIG. 2 for unscheduled work.

FIGS. 2-6 are flowcharts that show exemplary algorithms and protocols that may be used to mitigate the risk of compromising confidential or proprietary information when an intelligent listening device is in the general area of an employee or her customer when they are having a business discussion that involves exchanging confidential and/or proprietary information. These processes are conducted and managed by a deactivation app 190 that may be housed in server 182 (as shown in FIG. 1) or may be housed in a separate computer in communication with server 182, or may even be installed in the personal computer of each employee who works remotely. The login process starts at step 202 in FIG. 2, when the employee turns on her desktop computer 106 and reaches an office communications module 188 on her company's server 182. The steps following that first step are shown in FIGS. 2-4. In step 204, office communications module 188 in server 182 determines whether the employee is trying to login in during her scheduled working hours or whether the employee is attempting an unscheduled login. If the login is during scheduled working hours, the login procedure goes from step 206 in FIG. 2 to step 302, shown in FIG. 3. If the login is unscheduled, the process goes from step 208 in FIG. 2 to step 402, shown in FIG. 4.

The processes that apply to scheduled logins starts with step 302 which is shown in FIG. 3. In step 304, the process determines whether the attempted login is from a private network (such as the employee's home network or the company's local area network) or from a public network (such as a coffee shop, a library or a hotel room). If the attempted login is from a private network, the process goes on to an automated shutdown process 306, shown schematically in FIG. 5. If the attempted login is from a public network, the process issues warning protocols in step 308 to ensure that the employee understands the risks entailed in logging in from a public network.

Examples of these warning protocols may include warnings and requirements such as: (1) You are trying to log in from public network—are you willing to undertake the risk and accept responsibility for any liabilities that may ensue? (2) Have you surveyed your environment and made sure that there are no intelligent listening devices in the area? and (3) If you make a phone call with a customer, make sure that you do not discuss any confidential or proprietary information during the call. In some cases, the employee may not be planning to call any customers or to engage in any discussions that might entail disclosing proprietary information, and may be quite comfortable in working from a public location. The protocol may typically include the requirement that the employee acknowledge having received and understood the warnings. Then in step 310, after a short time delay, the process determines if an acknowledgement has been received. If an acknowledgement has not been received after a short time delay, the process returns to step 308 and re-issues the warnings. This cycle continues until office communications module 188 receives an acknowledgement from the employee. When such an acknowledgement is received, the employee is allowed to finish logging in at step 312.

FIG. 4 shows the processes that apply to unscheduled logins. The process starts in step 402, when office communications module receives a request to log in at a time that is outside of the employee's scheduled worktime. In step 404, the process determines if the login request is from a private or a public network. If it is from a private network, in step 406 the process asks the employee whether she would agree to a shut down of her IoT. Generally, if the employee expects to be working for longer than a short time, e.g., she would be working for several more hours, she will agree to a shut down. In that case, in step 408, the process goes on to the automated shut down process shown schematically in FIG. 5 and allow the employee to finish logging in.

However, the employee may not agree to having her IoT shut down, for one of several reasons. For example, the employee may only be planning to log on for a few minutes—maybe to check her emails or to retrieve data from her office files, for example—and does not believe it is necessary to shut down her IoT and possibly disrupt her family's routine. Also, the employee may not be planning to talk to any customers or have any conversations about company business, such that here would not be any need to shut down any listening devices. In these cases, she answers "no" and the process goes on to issue the warning protocols in steps 410, and require acknowledgement in step 412 before allowing the login to be completed in step 414.

Figure 5:
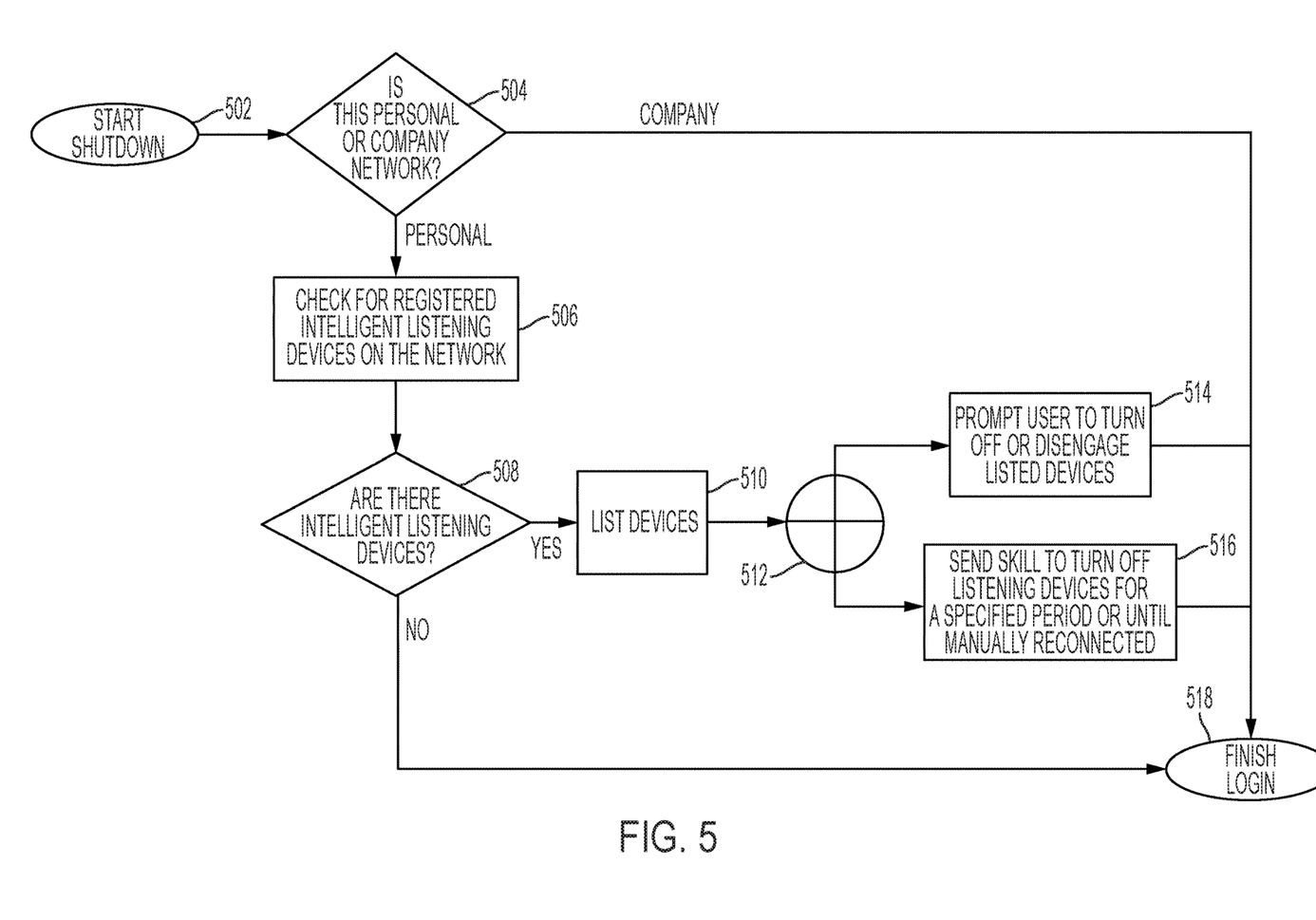
FIG. 5 is an exemplary schematic diagram showing a process for conducting an automatic shutdown.

An example of the automated shutdown procedure referenced in FIG. 3 and FIG. 4 is shown schematically in FIG. 5. The shutdown starts at step 502. In step 504, the process determines whether the login attempt is from a personal network (such as the employee's home network) or from the company network. If the login attempt is from the company network, a shutdown may not be necessary, and the login is allowed to proceed in step 518.

If the login attempt is from a personal network, the process checks to determine if any intelligent listening devices have been registered with the company in step 506. In some cases, the office communications module has already registered a list of all the devices attached to the employee's home network. In other cases, the office communications module may interrogate the employee's home network and identify all intelligent listening devices on the employee's home network. In fact, when there is installation of a new device in the home or because a visitor to the home has brought a new device such as a smart phone into the home after the employee has logged in, the risk may not be effectively mitigated by a process that ends with the employee login. Thus deactivation app 190 may be configured to check for additional devices at regular intervals during the workday. In any event, the process goes on to step 508 to check for listening devices. If there are no intelligent listening devices, the process allows the employee to log in at step 518. If there are intelligent listening devices, the process provides a list of such devices to step 512 which directs the process to both step 514 and step 516. Then in step 514 the employee is prompted to turn off or disengage intelligent listening devices, and in step 516, send a skill (for example, a "voicekill" command) to those listening devices that could be turned off automatically. For example, a skill could be sent to the employee's laptop so that it would issue a voice command to the IPA to stop listening for a predetermined period of time or until manually reconnected. The employee could also be instructed to manually turn off any listed ILDs or IPAs that cannot be automatically turned off. For example, in step 514, the employee may be instructed to disable her smart phone's IPA app. When both steps 514 and 516 have been executed, the process then allows the employee to finish logging in at step 518.

Figure 6:
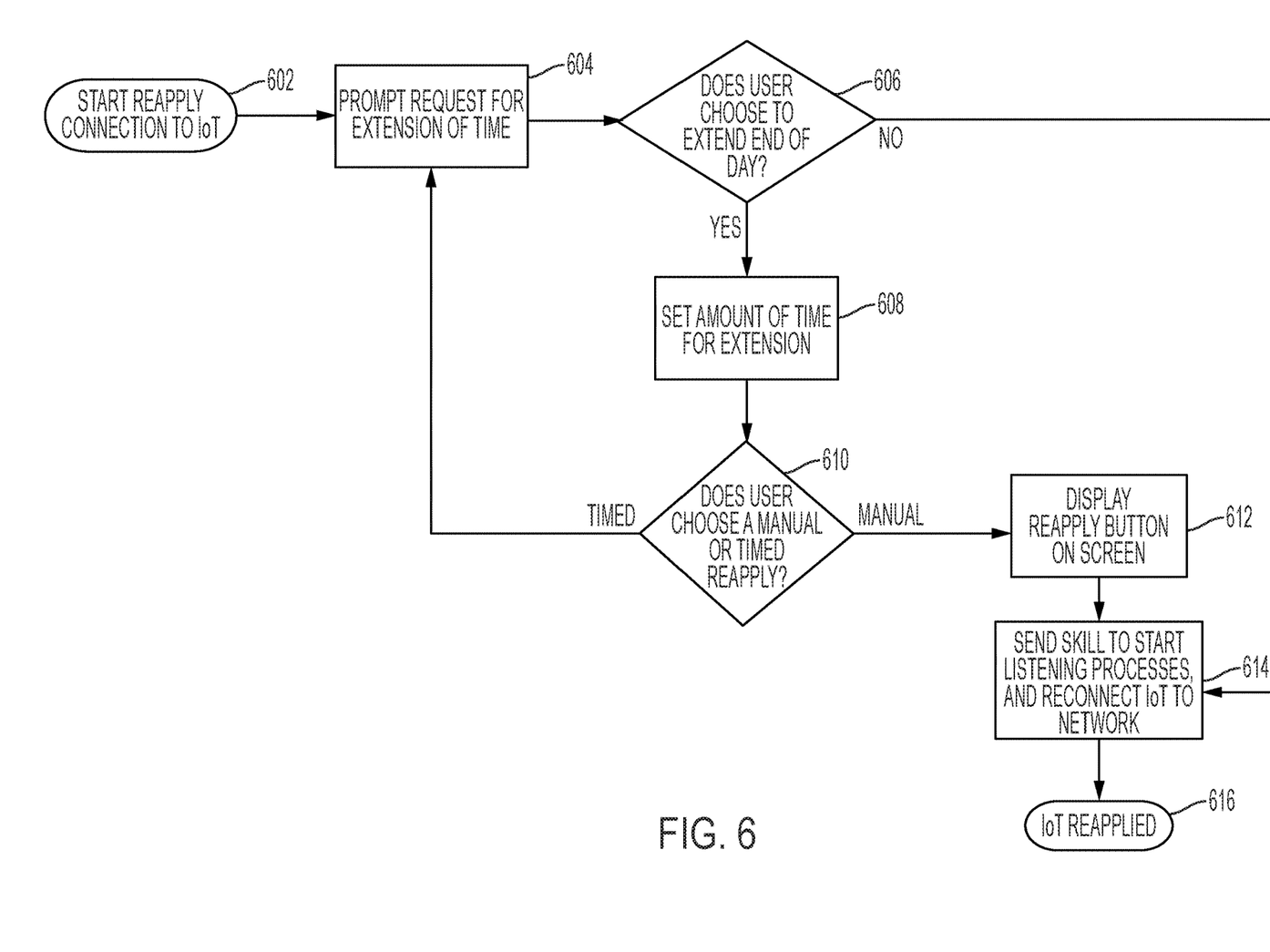
FIG. 6 is an exemplary schematic diagram showing a process for reapplying connections when the shutdown period is over.

After the employee's workday is over, either based upon a time set by the employee when she first logged in or based upon that employee's schedule, the office communications module reapplies the IPA's connections to the IoT as shown schematically in FIG. 6. The reapplication process starts in step 602. In step 604, the process prompts the employee to request an extension of time in case she still has work to do that day. If she does not choose to extend her workday, the process goes to step 614. In step 614, the office communications module sends a skill to the employee's desktop computer 106 to re-start the IPA's intelligent listening function by issuing a voice command to the IPA, and reconnects the employee's IoT devices to her home network If she chooses to extend her workday in step 606, she is asked to set the duration of the extension in step 608 and asked to choose a manual or automatic time reapply in step 610. If she chooses a time reapply, the process returns to step 604 so that she can set the extension time period. If she chooses a manual reapply, the process goes on to step 612. In step 612, a reapply button is displayed at the top of the employee's screen. When the employee clicks on the reapply button, in step 614 the office communications module sends a skill to re-start the IPA's or ILD's intelligent listening function, and reconnects the employee's IoT to her home network. Alternatively, the reapply button prompts the employee's desktop computer to issue a voice command to the IPA to reactivate intelligent listening functionality.

Figure 7:
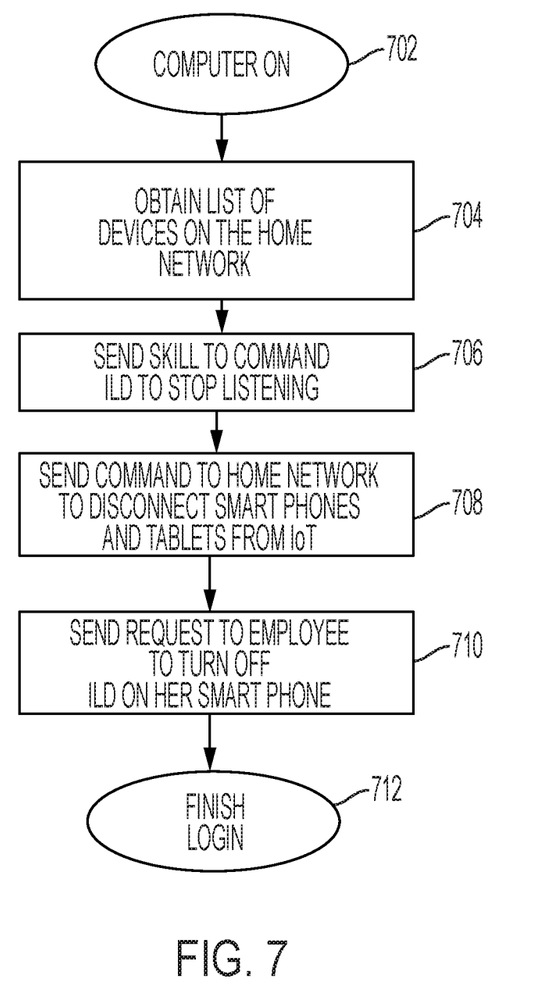
FIG. 7 is an exemplary flowchart showing an exemplary process that may be followed when an employee starts to log onto a company computer.

FIG. 7 is an exemplary flowchart that may be applied to the employee of FIG. 1 in her home with the devices shown in FIG. 1 when she turns on her desktop computer to start the login process as she sets about her scheduled work day. The process starts in step 702 when the employee turns on her desktop computer 106. In step 704, the office communications module 188 obtains a list of the devices on the home network. In step 706, it then sends a skill to the desktop computer 106, instructing it to send a voice command to IPA to stop listening until the end of the workday, for example for eight hours. Office communications module 188 may also, in optional step 708, send a command to the employee's home network to disconnect the employee's smart phone 114 and tablet 120 from the home IoT network. In step 710, the employee may be instructed to turn off the IPA on her smart phone. The employee may then finish her login at step 712. Some devices may not allow their voice-activated functions to be closed down, in which case those devices may need to be turned off completely.

In some cases, the employee's home IoT network may need to be shut down for the entire work day, for example because the employee is planning on spending her workday on the phone with her customers discussing confidential information, and/or she may expect that members of her family will be home and might be using some voice-activated devices, for example. On the other hand, in other cases, it may not be necessary to shut down the IoT network because none of her work would entail discussing confidential information out loud, for example because she would be communicating via email or via a chat function.

Note that there is no need to disconnect the student's laptop from the IoT network, both because the laptop does not (in this example) have an IPA, and because the laptop is on the second floor, out of range of the employee's and her customers' voices. It is generally not necessary to disconnect other devices connected to the IoT such as the refrigerator 124, or the microwave oven 122 from the IoT network as long as those devices are not intelligent listening devices. It may also not be necessary to ask the employee to turn off IPA on the student's smart phone 116 as long as the student leaves it up in his bedroom whenever he goes down to the first floor of the house.

Figure 8:
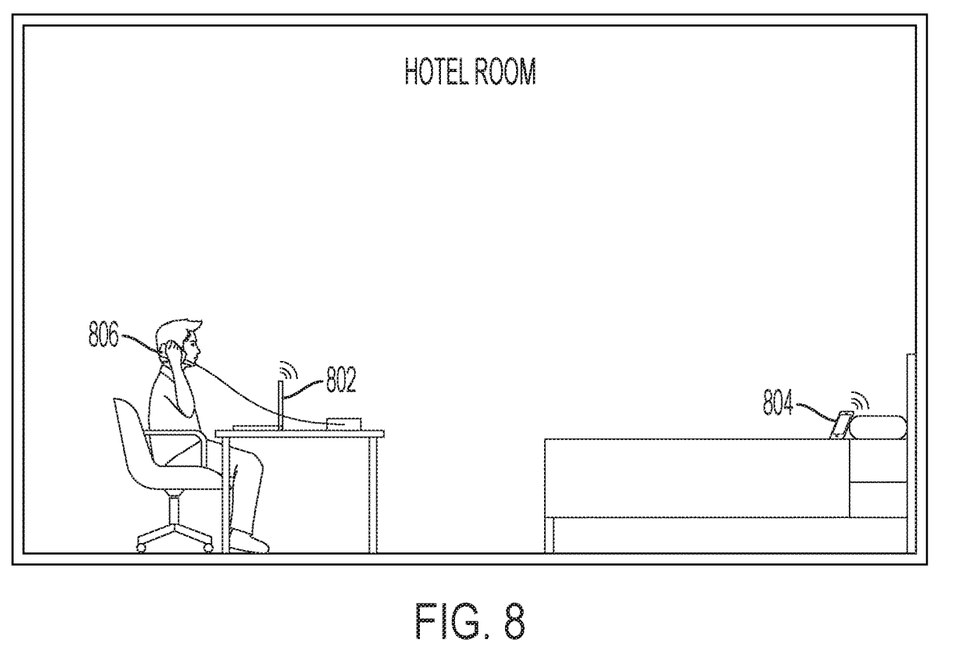
FIG. 8 is an illustration of an employee working in a hotel room.

At times, a company's employees may be on travel, and working out of a somewhat private location such as a hotel room. For example, the employee may be an engineer who may be pitching a project to a prospective customer or a salesman making calls to distributors of his company's products. Although a hotel room is not as private as a home office or a company office, it is still less public than locations such as a coffee shop or a restaurant. FIG. 8 shows an example of an employee working at a desk in a hotel room. His laptop computer 802 is logged into the company server 182 via the hotel's WiFi network, and he has left his smart phone 804 on the bed. He is planning on talking to a prospective customer (not shown) over the hotel's landline telephone 806 after he has logged in to the company's server.

Figure 9:
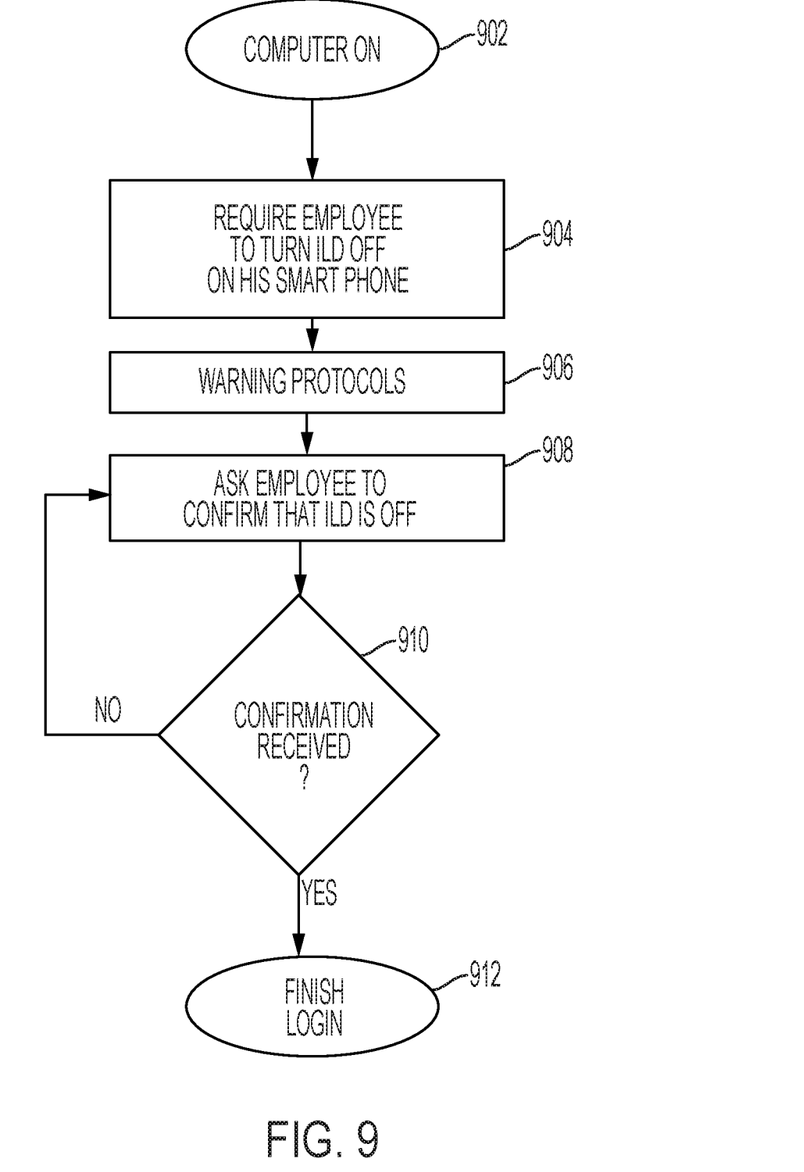
FIG. 9 is an exemplary flowchart showing a process for logging onto a company computer from a somewhat private location such as a hotel room.

FIG. 9 is a flowchart showing the process for mitigating the company's risks when an employee is working out of a location such as a hotel room. The process starts in step 902 when the employee turns on his laptop computer 802 and starts to log onto the company server 182 via the office communications module 188. In step 904 the process requires the employee to turn off the ILD or IPA on his smart phone 804, and then issues the company's warning protocols for employees working out of hotel rooms in step 906. The warnings are generally similar to the warnings issued for working in public locations, but may be adjusted to account for the lesser risk of working in a hotel room instead of at a coffee shop. In step 908, the employee is asked to confirm that he has turned off the ILD or IPA on his smart phone 804 and to acknowledge receiving the company's warnings. In step 910, the process checks to see if the employee has confirmed turning off the ILD or IPA and acknowledged receiving and understanding the warnings. If he has not yet done so, the process returns to step 908 after a short time delay. Once the requested confirmation and acknowledgement are received, the employee is allowed to log in at step 912.

Figure 10:
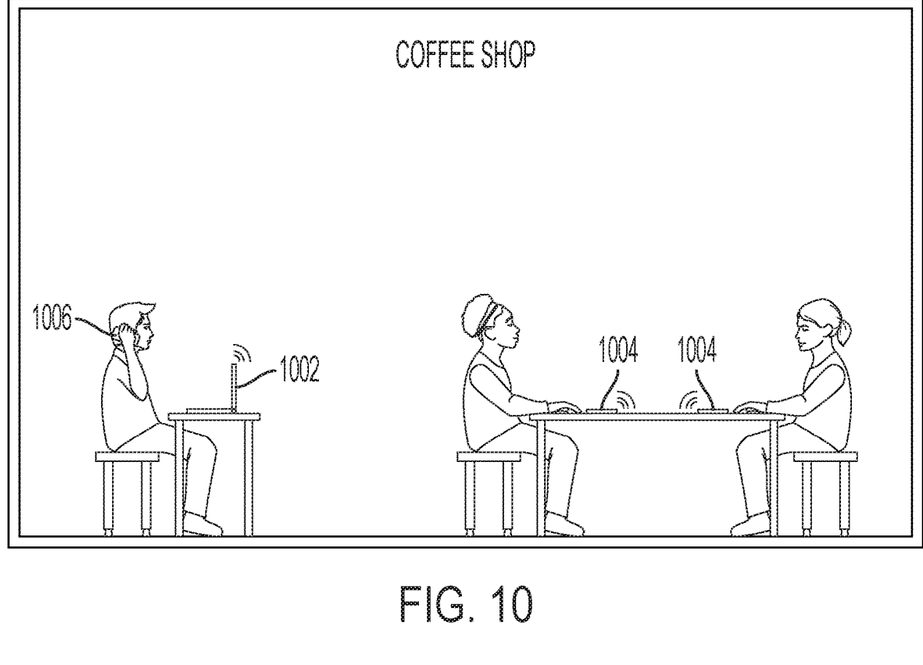
FIG. 10 is an illustration of an employee working from a coffee shop.

FIG. 10 shows an example of an employee working on her laptop 1002 in a coffee shop, and logging onto the company's server. In that case, the procedures for logging in from a public location shown in the right-hand sides of FIG. 3 and FIG. 4 apply. The employee is talking over her smartphone 1006 to a customer (not shown) at a remote location. A couple of bystanders sitting at a nearby table have their smart phones 1004 laying on the table. As noted above, this situation poses a risk that the bystanders' smartphones may accidentally record the employee's voiced confidential information.

Figure 11:
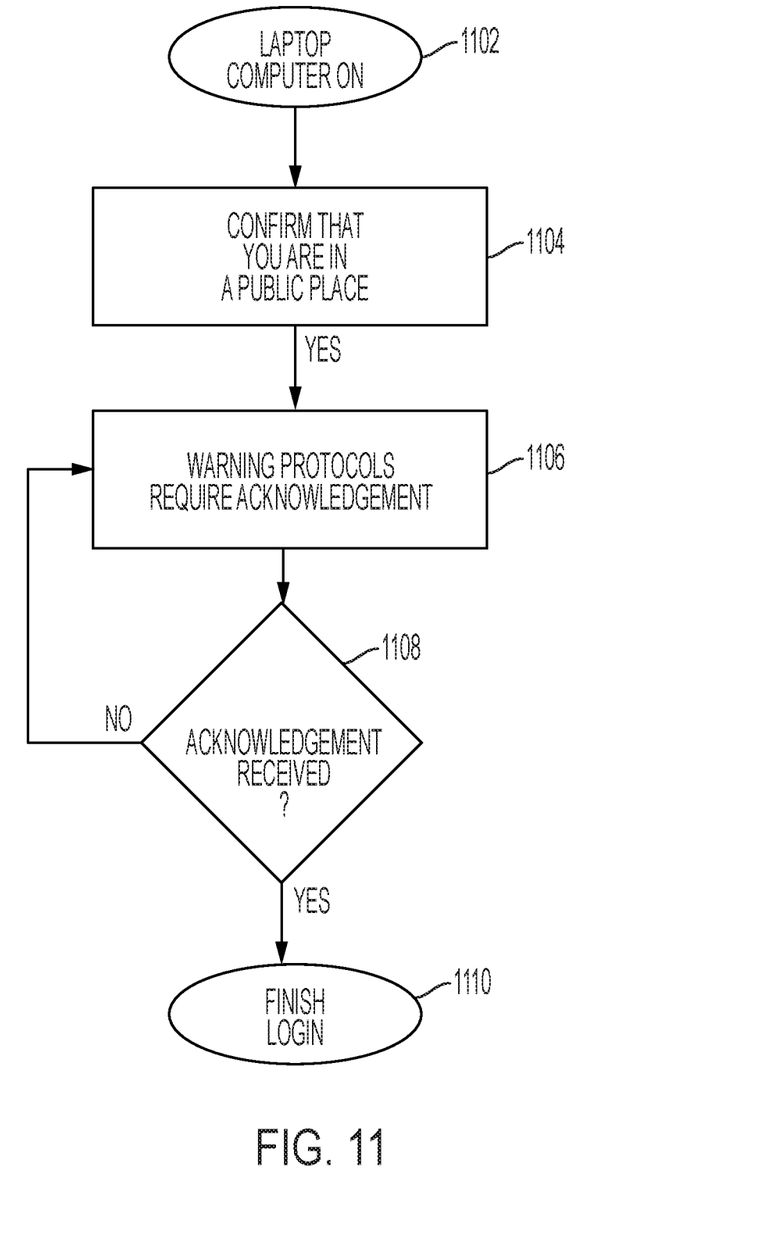
FIG. 11 is an exemplary flowchart showing a process for logging onto a company computer from a public location such as a coffee shop.

FIG. 11 is a flow chart showing the process for logging on from a public location such as the one shown in FIG. 10. In step 1102, the employee turns on her laptop 1002 and starts the login process. Because the office communication module 188 does not recognize the network that the employee is calling from, in step 1104, the office communication module 188 asks the employee to confirm that she is in a public place. The employee answers yes, and in step 1106 the office communications module 188 issues the standard warning protocols for working from a public location. After a short time delay, the process checks whether the acknowledgement has been received in step 1108. When the acknowledgement is received in step 1108, the employee is allowed to log in at step 1110.

The functions and systems disclosed above could be implemented using a variety of systems. For example, some of the apps and protocols may be based in the cloud. Also, certain protocols may be designed for employees who have extensive customer contact, and other protocols may be designed for employees who have minimal customer contact. Other protocols may be designed for less experienced or short-term or temporary employees. For example, such employees may be barred from working in a public location such as a coffee shop. Yet other protocols may be designed for outside contractors (such as, for example, outside adjusters working for an insurance company).

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for deactivating intelligent personal assistants comprising:
    a local area network that comprises a router, a first computing device and at least one voice-activated device;
    wherein the first computing device is configured to communicate with a second computing device through a server, the second computing device being located on a different network from the local area network;
    a deactivation app in communication with the router, wherein the deactivation app is housed in at least one of the server, the first computing device, and the second computing device;
    wherein the at least one voice-activated device comprises an intelligent personal assistant;
    wherein the intelligent personal assistant responds to voice commands and stores auditory information in memory;
    wherein the deactivation app is configured to:
        detect that the first computing device is logging into a process running on the second computing device;
        determine whether the local area network is a public network or a private network; and
        issue commands to the voice-activated device that disable the intelligent personal assistant when the deactivation app determines that the local area network is a private network; or
        issue warnings to a user of the first computing device when the deactivation app determines that the local area network is a public network.

2. The system of claim 1, wherein the server comprises an office communications module that controls communications between the server and the home private network, wherein the office communications module includes a list of all devices in direct communication with the private home network.

3. The system of claim 2, wherein the office communications module is configured to identify all devices in direct communication with the home private network.

4. The system of claim 1, wherein the deactivation app is configured to determine whether an employee is attempting to log in during scheduled hours.

5. The system of claim 1, wherein the home private network comprises a plurality of additional devices in addition to the at least one voice-activated device, and the deactivation app is configured to disconnect certain of the plurality of additional devices from the home private network when an employee is logged onto the server.

6. The system of claim 1, wherein the warnings include warnings that other intelligent personal assistants may be listening to the user.

7. The system of claim 1, wherein the deactivation app is configured to prompt the user to agree to shutting down the at least one voice-activated device in response to detecting that the local area network is a private network.

8. The system of claim 7, wherein the deactivation app issues additional warnings to the user if the user does not agree to shutting down the at least one voice-activated device.

9. A system for mitigating the risk of inadvertently disseminating confidential or proprietary information when using a telephone in the presence of a voice-activated device comprising:
    a local area network in a location comprising a router and a plurality of devices in communication with the local area network, wherein the plurality of devices include a first computing device, and the voice-activated device, wherein the voice-activated device houses an intelligent personal assistant that responds to voice commands and stores auditory information in memory;
    a deactivation app that is configured to:

detect that the first computing device is communicating with a second computing device over a wide area network;

determine whether the local area network is a public network or a private network; and issue commands to the voice-activated device that disable the intelligent personal assistant when the deactivation app determines that the local area network is a private network; or issue warnings to a user of the first computing device when the deactivation app determines that the local area network is a public network.

10. The system of claim 9, wherein the warnings include warnings that other intelligent personal assistants may be listening to the user.

11. The system of claim 9, further comprising a server located in a company office, wherein the server comprises an office communications module that controls communications between the local area network and the server and is associated with a database that contains proprietary information and confidential information.

12. The system of claim 11, wherein the office communications module is configured to associate login attempts with company employees, and to determine whether the login attempts are within the company's employees scheduled work hours.

13. The system of claim 11, wherein the issued commands to the voice-activated device disable the intelligent person assistant for a prescribed time period.

14. The system of claim 9, wherein the deactivation app is configured to instruct an employee who is attempting to login to manually disable any intelligent personal assistants that cannot be turned off automatically.

15. The system of claim 9, wherein the deactivation app is configured to reactivate the intelligent personal assistant after a prescribed time.

16. A method for preventing the incidental dissemination of confidential or proprietary information when using a telephone in a location with a local area network comprising:

identifying all devices in communication with the local area network;

identifying voice-activated devices among all the devices in communication with the local area network, wherein the voice-activated devices respond to voice commands and store auditory information in memory;

detecting that a first computing device is logging into a process running on a second computing device, wherein the first computing device is connected to the local area network, and wherein the first computing device communicates with the second computing device over a wide area network;

determining whether the local area network is a public network or a private network; and disabling the voice-activated devices in response to determining that the local area network is a private network; or issuing warnings to a user of the first computing device in response to determining that the local area network is a public network.

17. The method of claim 16, further comprising re-activating the voice-activated devices after a prescribed period of time.

18. The method of claim 16, further comprising determining if the first computing device is logging in during unscheduled work hours and issuing warnings to the user when the first computing device is logging in during unscheduled working hours.

19. The method of claim 16, wherein the issued warnings inform the user that one or more intelligent personal assistants may be listening.

20. The method of claim 16, wherein disabling the voice-activated devices includes disabling voice-activated functionality of the voice activated devices.

* * * * *